No. 862,095. PATENTED JULY 30, 1907.
B. P. MULLOY.
AUTOMATIC WEIGHING DEVICE.
APPLICATION FILED MAY 7, 1906.
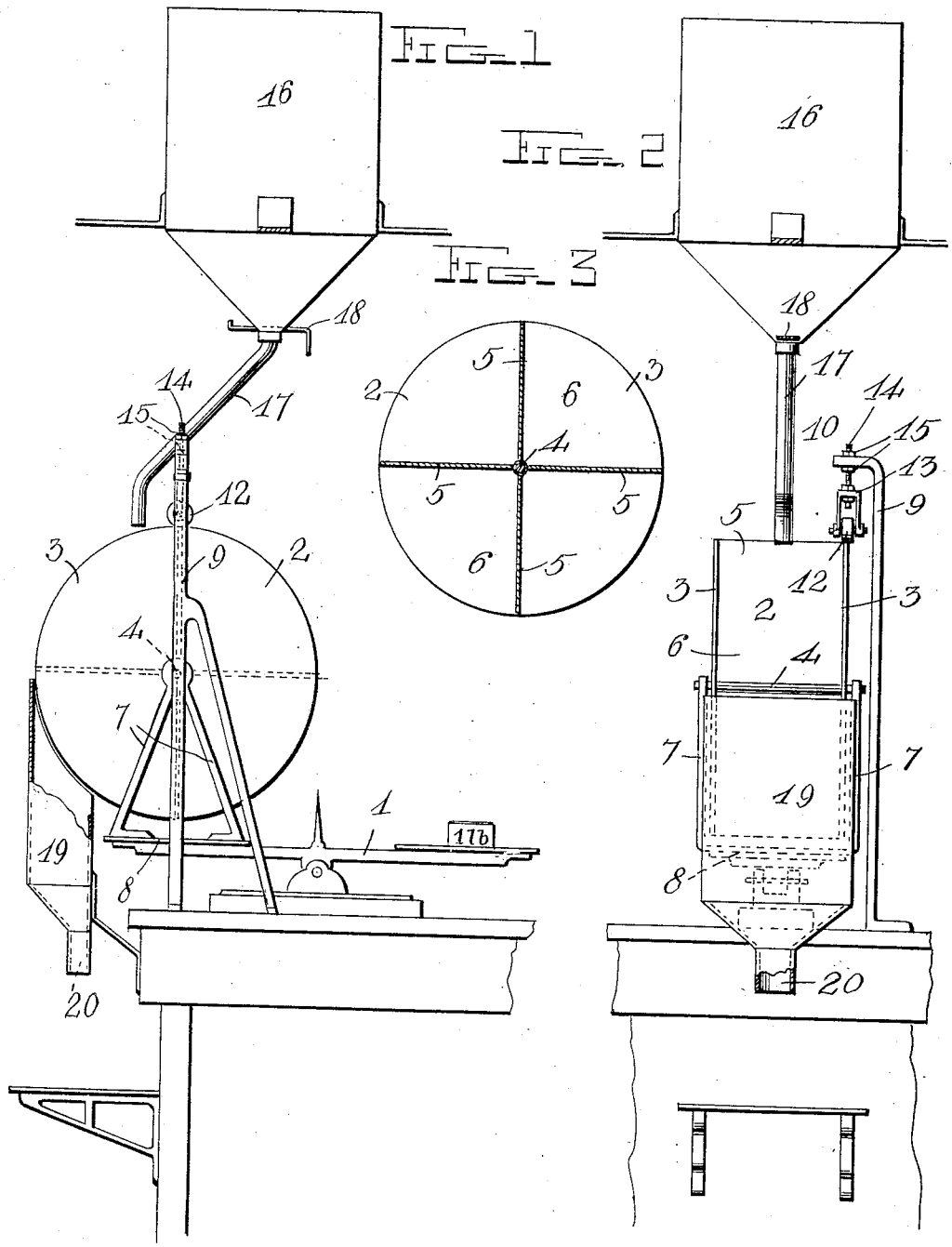
Witnesses
Inventor
B. P. Mulloy
by H. B. Willson & Co
Attorneys

UNITED STATES PATENT OFFICE.

BERNARD PATRICK MULLOY, OF NEW ALBANY, INDIANA.

AUTOMATIC WEIGHING DEVICE.

No. 862,095.        Specification of Letters Patent.        Patented July 30, 1907.

Application filed May 7, 1906. Serial No. 315,645.

*To all whom it may concern:*

Be it known that I, BERNARD PATRICK MULLOY, a citizen of the United States, residing at New Albany, in the county of Floyd and State of Indiana, have invented certain new and useful Improvements in Automatic Weighing Devices; and I do declare the following to be a full, clear, and exact description of the invention, such as will enable others skilled in the art to which it appertains to make and use the same.

This invention relates to improvements in automatic weighing devices.

The object of the invention is to provide a device of this character by means of which material may be automatically weighed and delivered to a bag or other receptacle provided therefor.

A further object is to provide a device of this character which will be simple and inexpensive in construction, efficient and reliable in operation and well adapted to the purpose for which it is designed.

With the above and other objects in view, the invention consists of certain novel features of construction, combination and arrangement of parts, as will be hereinafter described and claimed.

In the accompanying drawings:—Figure 1 is a side view of an automatic weighing machine constructed in accordance with the invention; Fig. 2 is a front view of the same; Fig. 3 is a vertical, longitudinal sectional view through the revolving scale pan or scoop.

Referring more particularly to the drawings, 1 denotes a pair of scales, which may be of any suitable construction, but which are here shown, and are preferably balance scales, one arm of which is adapted to receive weights while on the other arm is supported a revoluble scale pan or scoop 2, said pan or scoop being here shown as consisting of two cylindrical disks 3 mounted upon a central, transversely-disposed shaft 4 and spaced apart by radial, right angularly-disposed partitions 5, between which are formed receiving compartments 6 to receive the material to be weighed. The shaft 4 of the scoop is mounted in a bearing formed in the upper ends of converging brace bars 7, the lower ends of which are secured to a plate 8 on the arm of the scale, as shown. Arranged adjacent to the scales 1 is an upwardly-projecting, suitably braced standard 9 having on its upper end a right angularly projecting arm 10, on which is adjustably mounted a depending stop roller 12. The roller 12 is journaled in a yoke 13, whereby said roller is readily revolved therein. The yoke 13 is adjustably connected to the arm 10 by a bolt 14 having arranged thereon jam nuts 15.

By means of the stop roller 12, the scoop 2 will be held from revolving on the shaft 4 when the scoop is empty owing to the frictional contact of said roller with one of the disks 3. When the weight of the goods in the scoops overcomes this friction and the weight on the scale, the wheel revolves and discharges the contents of the scoops.

Arranged in suitable supports above the scoop 2 is a feed hopper 16, said hopper having a converged bottom, with which is connected a feed spout 17. In the spout 17 adjacent to the lower end of the hopper is arranged a cutoff valve 18, by means of which the feed of the hopper is regulated. The discharge end of the spout 17 is arranged over the scoop in a plane a slight distance to one side of the plane of the shaft on which said scoop is mounted, so that when the material from the hopper is deposited into one of the compartments of the scoop, the latter may be overbalanced when the scoop is released from the stop roller 12, said scoop being released from the roller when the weight of the material in the compartment thereof is sufficient to overbalance the weight on the opposite arm of the scale, as will be understood.

Arranged in suitable supports in front and adjacent to the open edge of the scoop is a delivery chute 19, the upper end of which is curved or hollowed out to enable the same to be closely engaged with the periphery of the scoop. The lower end of the chute 19 is preferably provided with a funnel-shaped opening 20, by means of which the material from the scoop will be directed into a bag or other receptacle arranged beneath said chute.

A weighing device of the character described will automatically and accurately weigh and bag the material in the feed hopper, and will operate continuously as long as any material remains in said hopper.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

An automatic weighing device comprising a counterbalancing scale beam adapted to receive a weight at one end and having a revoluble scale pan with a plurality of compartments mounted on its other end, and an adjustable roller disposed in position to frictionally engage said pan at any point to hold it against rotation.

In testimony whereof I have hereunto set my hand in presence of two subscribing witnesses.

BERNARD PATRICK MULLOY.

Witnesses:
    DOROTHY MERL,
    JOSEPH S. FOLEY.